Patented July 17, 1934

1,966,488

UNITED STATES PATENT OFFICE 1,966,488

PRODUCTION OF ARALKYL ALCOHOLS

Eugen Dorrer and Heinrich Hopff, Ludwigshafen-on-the-Rhine, Germany, assignors to I. G. Farbenindustrie Aktiengesellschaft, Frankfort-on-the-Main, Germany No Drawing. Application March 13, 1933, Serial No. 660,454. In Germany March 16, 1932

14 Claims. (Cl. 260—153)

The present invention relates to the production of aralkyl alcohols.

We have found that aralkyl alcohols can be obtained with very good results especially as regards the yields by causing an alkylene oxide or an alkylene halogen hydrin, capable of forming such oxide, to act on an about equimolecular proportion of a metal compound of an aromatic hydrocarbon containing up to 2 condensed nuclei. As such metal compounds of aromatic hydrocarbons may be mentioned those from alkali metals such as sodium, potassium, lithium, caesium and rubidium, from alkaline earth metals, such as barium, strontium and calcium, from magnesium, aluminium, cadmium, zinc and mercury, for example phenyl mercury, phenyl sodium, tolyl sodium, xylyl sodium, naphthyl sodium, phenyl potassium or diphenyl sodium, which are readily obtainable, for example by converting halogen aryls with said metals in indifferent solvents, such as benzene or petroleum ether.

The said alkylene oxides comprise for example ethylene oxide, 1.2- and 1.3-propylene oxides, symmetrical dimethyl ethylene oxide (2.3-butylene oxide), ethyl ethylene oxide (1.2-butylene oxide), trimethyl ethylene oxide, phenyl ethylene oxide, phenyl propylene oxide, tolyl and naphthyl ethylene oxides and like alkylene or arylated alkylene oxides. The said alkylene halogen hydrins are capable of forming such alkylene oxides by splitting off one molecule of the corresponding hydrohalic compound; thus glycol chlorhydrin yields, intermediately, ethylene oxide under the working conditions employed by splitting off HCl, whereas glycol bromhydrin and glycol jodhydrin split off HBr or HJ, respectively. The alkylene halogen hydrins corresponding to the aforesaid alkylene oxides may accordingly be employed instead of the said alkylene oxides.

The new method of preparing aralkyl alcohols proceeds simply and smoothly. For example when employing ethylene oxide it may lead to beta-arylethyl sodium alcoholates, when employing ethylene chlorhydrin directly to free beta-arylethyl alcohols according to the equation:—

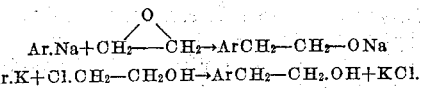

$$Ar.Na + CH_2\!\!-\!\!\!\overset{O}{\diagdown}\!\!\!-\!\!CH_2 \rightarrow ArCH_2\!-\!CH_2\!-\!ONa$$
$$Ar.K + Cl.CH_2\!-\!CH_2OH \rightarrow ArCH_2\!-\!CH_2.OH + KCl.$$

In carrying out the process, the desired alkylene oxide, as for example ethylene oxide, propylene oxide of phenyl ethylene oxide, if desired together with a gaseous inert diluent, as for example nitrogen, argon, hydrogen, or methane, ethane, propane or butane, is led at any desired pressure, i. e. at atmospheric, reduced or increased pressure up to about 100 atmospheres, into a suspension of the metal compound, of an aromatic hydrocarbon in an inert solvent which remains liquid at the working temperature, such as hydrocarbons, for example pentane, hexane, butylene, amylene, hexahydrobenzene, tetrahydronaphthalene, petroleum ether, ligroin, benzene or alkylated benzenes, such as toluene or xylene, or ethers such as diethyl ether, methyl ethyl ether, di-n-butyl ether, di-isobutyl ether, anisol or phenetol; or an alkylene halogen hydrin, such as epichlorhydrin or 1.2-butylene chlorhydrin ether as such or dissolved in an inert solvent as stated above is allowed to flow into such a suspension. The suspension of the metal compound of the hydrocarbon may, however, be allowed to flow into a solution of alkylene oxide or alkylene halogen hydrin. This latter method is especially to be recommended in the case of halogen hydrins because an excess of aryl-metal compound may react with the aralkylalcohol first formed with the formation of hyrocarbon.

The reaction is generally carried out at from about 80° below zero C. to about 50° C., it is preferable, especially in the case of alkylene oxides, to work at low temperatures, i. e. below zero C., in order to avoid polymerization of the alkylene oxide. It is obvious that the solvent employed in each case must be liquid at the working temperature chosen. For example, when working with phenyl sodium and ethylene oxide at 25° C., a considerable amount of an oily substance is obtained, while at low temperatures, as for example 50° below zero C., its formation is practically entirely suppressed. The employment of low temperatures is also advisable because the conversion proceeds rather vigorously. For the same reason it is advantageous to employ diluents and to stir the reaction mixture well. When working at very low temperatures, as for example 80° below zero C., a too marked retardation of the conversion may be prevented by the addition of substances having the effect of accelerating the reaction, for example solid substances having a large superficial area, such as active carbon, silica gel, asbestos or bleaching earths.

The following examples will further illustrate the nature of this invention but the invention is not restricted to these examples. The parts are by weight.

*Example 1*

11 parts of gaseous ethylene oxide are led so slowly while stirring into a suspension of 25 parts of phenyl sodium in 120 parts of absolute toluene cooled to 50° below zero C. by means of acetone and solid carbon dioxide, that the temperature does not rise above 45° below zero C. It is preferable to dilute the ethylene oxide with nitrogen in order to prevent too rapid a conversion in the neighbourhood of the inlet pipe.

Instead of gaseous ethylene oxide, for example a 20 per cent solution thereof in toluene may be employed.

The reaction mixture is brought slowly to normal temperature and the alcoholate is then decomposed by the addition of water. The aqueous layer formed is supersaturated with common salt in order to salt out the small amounts of alcohol dissolved therein, and then withdrawn. The toluene layer is dried with anhydrous potassium sulphate, the toluene distilled off and the residue subjected to a fractional distillation in vacuo. Phenyl ethyl alcohol having a boiling point of from about 97° to about 98° C. at 10 millimetres (mercury gauge) is obtained in a very good yield; by reason of its great purity it is eminently suitable as a perfume.

Example 2

A suspension of 29 parts of phenyl potassium in 120 parts of absolute petroleum ether is allowed to flow slowly while stirring well into a solution of 20 parts of ethylene chlorhydrin in 100 parts of anhydrous petroleum ether cooled with ice and common salt, the temperature being kept between 10° below zero and zero C. The potassium chloride separating out is filtered off by suction or washed out with a little water; the petroleum ether is distilled off and the residue subjected to fractional distillation. Phenyl ethyl alcohol is thus obtained in a very pure form.

Example 3

A gaseous mixture of 66 parts of nitrogen and 22 parts of ethylene oxide is led, while strongly stirring, into a suspension of 57 parts of para-tolyl sodium in 250 parts of anhydrous benzene cooled to 4° C., the temperature being kept between 2° and 4° C. The reaction mixture is allowed to stand at 4° C. for some time and is then slowly brought to room temperature. The alcoholate formed is then decomposed by the addition of 100 parts of water. The aqueous layer formed is supersaturated with common salt and then withdrawn and shaken with a little benzene. The two benzene layers are united and then dried with anhydrous magnesium sulphate; the benzene is distilled off and the residue is subjected to a fractional distillation in vacuo. Paratolyl ethyl alcohol, having a boiling point of from about 113° to about 117° C. at 11 millimetres (mercury gauge) is obtained in an excellent yield; it has an agreeable, peculiar fragrance of flowers. The phenyl urethane of the said alcohol has a melting point of about 115° C. after recrystallization from a mixture of ethyl ether and ligroin.

What we claim is:—

1. The process for the production of aralkyl alcohols, which comprises reacting a compound selected from the group consisting of alkylene oxides and alkylene halogen hydrins on an about equimolecular proportion of a metal compound of an aromatic hydrocarbon containing up to 2 condensed nuclei.

2. The process for the production of aralkyl alcohols, which comprises reacting a compound selected from the group consisting of alkylene oxides and alkylene halogen hydrins on an about equimolecular proportion of a metal compound of an aromatic hydrocarbon containing up to 2 condensed nuclei at a temperature between about 80° below zero C. and about 50° C.

3. The process for the production of aralkyl alcohols, which comprises reacting a compound selected from the group consisting of alkylene oxides and alkylene halogen hydrins on an about equimolecular proportion of a metal compound of an aromatic hydrocarbon containing up to 2 condensed nuclei at a temperature between about 80° below zero C. and about zero° C.

4. The process for the production of aralkyl alcohols, which comprises reacting a compound selected from the group consisting of alkylene oxides and alkylene halogen hydrins on an about equimolecular proportion of a metal compound of an aromatic hydrocarbon containing up to 2 condensed nuclei at a temperature between about 80° below zero C. and about 50° C. in the presence of an inert diluent.

5. The process for the production of aralkyl alcohols, which comprises reacting a compound selected from the group consisting of alkylene oxides and alkylene halogen hydrins on an about equimolecular proportion of a metal compound of an aromatic hydrocarbon containing up to 2 condensed nuclei at a temperature between about 80° below zero C. and about 50° C. in the presence of an inert diluent which is liquid at the working temperature and selected from the group consisting of hydrocarbons and ethers.

6. The process for the production of aralkyl alcohols, which comprises reacting a compound selected from the group consisting of alkylene oxides and alkylene halogen hydrins on a suspension of an about equimolecular proportion of a metal compound of an aromatic hydrocarbon and containing up to 2 condensed nuclei in an inert diluent which is liquid at the working temperature and selected from the group consisting of hydrocarbons and ethers.

7. The process for the production of aralkyl alcohols, which comprises reacting a compound selected from the group consisting of alkylene oxides and alkylene halogen hydrins on a suspension of an about equimolecular proportion of a metal compound of an aromatic hydrocarbon containing up to 2 condensed nuclei in an inert diluent which is liquid at the working temperature and selected from the group consisting of hydrocarbons and ethers, at a temperature between about 80° below zero C. and about 50° C.

8. The process for the production of aralkyl alcohols, which comprises reacting a solution of a compound selected from the group consisting of alkylene oxides and alkylene halogen hydrins in an inert diluent which is liquid at the working temperature and selected from the group consisting of hydrocarbons and ethers on an about equimolecular proportion of a metal compound of an aromatic hydrocarbon containing up to 2 condensed nuclei, at a temperature between about 80° below zero C. and about 50° C.

9. The process for the production of aralkyl alcohols, which comprises reacting a solution of a compound selected from the group consisting of alkylene oxides and alkylene halogen hydrins in an inert diluent which is liquid at the working temperature and selected from the group consisting of hydrocarbons and ethers on a suspension of an about equimolecular proportion of a metal compound of an aromatic hydrocarbon containing up to 2 condensed nuclei in an inert diluent which is liquid at the working temperature and selected from the group consisting of hydrocarbons and ethers, at a temperature between about 80° below zero C. and about 50° C.

10. The process for the production of aralkyl alcohols, which comprises causing a suspension of a metal compound of an aromatic hydrocarbon containing up to 2 condensed nuclei in an inert diluent which is liquid at the working temperature and selected from the group consisting of hydrocarbons and ethers to flow into a solution of an about equimolecular proportion of an alkylene halogen hydrin in an inert diluent which is liquid at the working temperature and selected from the group consisting of hydrocarbons and ethers, at a temperature between about 80° below zero C. and about zero ° C., while stirring.

11. The process for the production of aralkyl alcohols, which comprises reacting a compound selected from the group consisting of alkylene oxides and alkylene halogen hydrins on an about equimolecular proportion of an alkali metal compound of an aromatic hydrocarbon containing up to 2 condensed nuclei, at a temperature between about 80° below zero C. and about 50° C.

12. The process for the production of aralkyl alcohols, which comprises reacting an alkylene oxide on an about equimolecular proportion of an alkali metal compound of an aromatic hydrocarbon containing up to 2 condensed nuclei, at a temperature between about 80° below zero C. and about 50° C.

13. The process for the production of aralkyl alcohols, which comprises reacting ethylene oxide on an about equimolecular proportion of an alkali metal compound of an aromatic hydrocarbon containing up to 2 condensed nulcei, at a temperature between about 80° below zero C. and about 50° C.

14. The process for the production of aralkyl alcohols, which comprises reacting ethylene oxide on a suspension of an about equimolecular proportion of a phenyl-alkali metal compound in an inert diluent which is liquid at the working temperature and selected from the group consisting of hydrocarbons and ethers, at a temperature between about 80° below zero C. and about 50° C.

EUGEN DORRER.
HEINRICH HOPFF.